(12) United States Patent
Baudoin et al.

(10) Patent No.: US 10,659,846 B2
(45) Date of Patent: May 19, 2020

(54) SYSTEM AND METHOD FOR TRANSMITTING DATA IN A SATELLITE SYSTEM

(71) Applicant: THALES, Courbevoie (FR)

(72) Inventors: Cédric Baudoin, Toulouse (FR);
Renaud Sallantin, Toulouse (FR);
Fabrice Arnal, Cugnaux (FR)

(73) Assignee: THALES, Courbevoie (FR)

( * ) Notice: Subject to any disclaimer, the term of this patent is extended or adjusted under 35 U.S.C. 154(b) by 0 days.

(21) Appl. No.: 15/847,839

(22) Filed: Dec. 19, 2017

(65) Prior Publication Data

US 2018/0176656 A1 Jun. 21, 2018

(30) Foreign Application Priority Data

Dec. 20, 2016 (FR) ...................................... 16 01806

(51) Int. Cl.
*H04N 21/61* (2011.01)
*H04B 7/185* (2006.01)
*H04B 7/204* (2006.01)
*H04H 20/74* (2008.01)

(52) U.S. Cl.
CPC ..... *H04N 21/6193* (2013.01); *H04B 7/18513* (2013.01); *H04B 7/18523* (2013.01); *H04B 7/18582* (2013.01); *H04B 7/2041* (2013.01); *H04H 20/74* (2013.01)

(58) Field of Classification Search
CPC ............ H04N 21/6193; H04B 7/18513; H04B 7/18523; H04H 20/74
See application file for complete search history.

(56) References Cited

U.S. PATENT DOCUMENTS

| 6,151,497 | A | 11/2000 | Yee et al. | |
|---|---|---|---|---|
| 6,697,850 | B1 | 2/2004 | Saunders | |
| 8,340,015 | B1* | 12/2012 | Miller | H04B 7/18519 370/325 |
| 2002/0129375 | A1* | 9/2002 | Kim | H04N 7/17318 725/100 |
| 2003/0033355 | A1 | 2/2003 | Saunders et al. | |
| 2003/0033433 | A1* | 2/2003 | Stroll | G06F 17/30902 709/246 |
| 2003/0043788 | A1* | 3/2003 | Hasegawa | H04B 7/18582 370/352 |

(Continued)

FOREIGN PATENT DOCUMENTS

| EP | 0 987 840 A2 | 3/2000 |
|---|---|---|
| EP | 1 284 458 A2 | 2/2003 |

OTHER PUBLICATIONS

"Report ITU-R S.2173: Multi-carrier based transmission techniques for satellites systems S Series Fixed-satellite service," Jul. 31, 2010, XP055412757.

*Primary Examiner* — Randy A Flynn
(74) *Attorney, Agent, or Firm* — Baker & Hostetler LLP

(57) ABSTRACT

A method and a system for transmitting data in a satellite system comprising at least one satellite, a gateway and a user terminal, comprises at least the following steps: transmitting a data content request Rq sent by a user to the gateway, upon receipt of the content of the request Rq, the gateway sends an order to the satellite so that the satellite transmits the content requested by the user to the user, the user acknowledges receipt of all or of at least a portion of this content to the gateway.

20 Claims, 4 Drawing Sheets

(56) References Cited

U.S. PATENT DOCUMENTS

| | | | |
|---|---|---|---|
| 2003/0123481 A1* | 7/2003 | Neale | H04B 7/18582 370/466 |
| 2005/0160465 A1* | 7/2005 | Walker | H04N 5/76 725/86 |
| 2005/0210121 A1* | 9/2005 | Taylor | H04L 67/2847 709/218 |
| 2008/0163311 A1* | 7/2008 | St. John-Larkin | H04N 21/6587 725/68 |
| 2008/0229021 A1* | 9/2008 | Plamondon | H04L 67/2847 711/125 |
| 2010/0179986 A1* | 7/2010 | Sebastian | H04L 12/1859 709/203 |
| 2011/0125820 A1* | 5/2011 | Lin | H04L 67/2842 709/201 |
| 2012/0254543 A1* | 10/2012 | Sintorn | H04L 67/104 711/126 |
| 2013/0102240 A1* | 4/2013 | Helfers | H04B 7/18513 455/3.02 |
| 2014/0136644 A1* | 5/2014 | Tuononen | H04L 67/2852 709/213 |
| 2014/0173134 A1* | 6/2014 | Choquette | H04L 61/1511 709/245 |
| 2016/0156448 A1* | 6/2016 | Gadat | H04B 7/18508 370/315 |
| 2017/0099227 A1* | 4/2017 | Slater | H04L 65/605 |
| 2017/0195448 A1* | 7/2017 | Su | H04L 65/4069 |

* cited by examiner

SYSTEM AND METHOD FOR TRANSMITTING DATA IN A SATELLITE SYSTEM

CROSS-REFERENCE TO RELATED APPLICATIONS

This application claims priority to foreign French patent application No. FR 1601806, filed on Dec. 20, 2016, the disclosure of which is incorporated by reference in its entirety.

FIELD OF THE INVENTION

The invention relates to a system and a method that are used in particular for transporting video data in multi-spot satellite telecommunication systems.

It is able to be used in any installation using a satellite system to optimize the transmission of video data or data of equivalent size.

BACKGROUND

Video services represent a large majority of the content transported via Internet infrastructures, of the order of 70 to 80%. In particular, on-demand services, in particular in "infra-service" service architectures, better known under the abbreviation OTT (over-the-top service) for video on demand (VoD), require both high throughputs and a guaranteed quality of service. Transmission thereof in the case of multi-spot broadcast (broadcast services) satellites therefore poses a problem, firstly regarding wastage of the resource, which is used several times for the same content, and secondly regarding limiting the impact of the latency introduced by the satellite on account of the transmission times and of the communication protocols implemented with these OTT service architectures.

The prior art describes various systems and methods for optimizing the transportation of these video data.

A first family of solutions is based on cache architectures implemented in the user ground segment. These architectures are designed to vastly improve the transportation and the quality of service offered for this content. However, in this solution, the presence of a cache in the satellite terminals involves a high extra cost for the user ground segment and maintenance and operational issues. In addition, the caches installed on the gateway side are not designed to limit the wastage of resources on the satellite segment.

A second family is based on an architecture that will process, at the satellite, the data on the outward path (gateway to user) and on the return path (user to gateway). The data will be demodulated/decoded, and the resulting data flows managed by a processor on board the satellite. In this context, a cache is used at the satellite to store the data. The decision to cache and the accessing of these data are performed directly by the on-board processor, as is described for example in U.S. Pat. No. 6,697,850. This solution has the drawback of requiring the return path to be regenerated, thereby complicating the payload of the satellite and in particular increasing its bulk and therefore its cost. An alternative solution is described in patent application US20030033355. The principle described consists in demodulating and decoding only the outward path to perform a time delay operation. This solution is therefore not compatible with the need to cache per object in relation to fast-forwarding the VoD. In this case, there is no access on demand, the (live) video stream is transmitted once at the satellite and redistributed to all of the users at a given time slot; there is no request for access from the users, nor congestion control or error recovery.

The system and the method according to the invention are based on a novel approach consisting notably in using, in a particular manner, a cache at the satellite that is associated with proxies positioned at the gateways on the ground, the outward path being processed at the satellite processor, said satellite being considered to be "transparent" for the return path (i.e. the RF signal is simply reamplified without being digitally processed).

The word "content" is used to denote services, data requested by a user, etc.

Users access content in the following manner. A first flow relates to the sending of the video content from a gateway to the satellite for storage at the satellite. When the users wish to access the content, they send a request flow, as far as the gateway, which is then redirected on board (to the satellite) in order then to be processed. Finally, the satellite is able to deliver the content to the terminals that have requested it, or even to other terminals in the same spot if they are able to store it.

SUMMARY OF THE INVENTION

The invention relates to a method for transmitting data in a satellite system comprising at least one satellite having demodulating and decoding capabilities and a gateway, said satellite being adapted to process and to store user data in a cache, the satellite system comprising at least one user terminal. The method is characterized in that it comprises at least the following steps:

transmitting a data content request Rq sent by one or more end users to the gateway by way of the user terminal and of the satellite, upon receipt of the content of the request Rq, after opening of the communication session, the request Rq is received by the gateway which verifies that the content requested by a user is available in a cache of the satellite, the gateway sends an order to the satellite, said order comprising all or some of the information contained in the request Rq, said order to the satellite indicating the data content or packets that are to be delivered to the requesting user terminal(s), the satellite transmits the content to the user and the user terminal(s) acknowledge receipt of at least a portion or of all of this content to the gateway.

According to one variant implementation, the data content to be transmitted is divided into a plurality of segments and, in the event of a loss of packets, the user indicates the packets that have not been received to the gateway, and the gateway resends an order to the satellite requesting it to retransmit the lost packet(s) during the following segment transmission sequence associated with the same content.

The gateway may use an HTPP and TCP proxy and the acknowledgement indication TCP ACK to indicate to the satellite the data content to be transmitted to a user.

According to one embodiment, the satellite distributes the data content in unicast.

The satellite may also distribute the data content using a multicast distribution protocol for distributing the most popular content to the user terminals.

The invention also relates to a system for transmitting data in a system comprising at least one satellite having demodulating/decoding means, a gateway and at least one user terminal, wherein:

the satellite comprises at least a switch receiving the decoded and demodulated data flows, said switch transmitting the signalling contained in the data flows to a processor adapted to execute the steps of the method according to the invention, a board cache adapted to memorize the users data considered eligible by a proxy situated in the gateway, the gateway comprises at least one proxy adapted to ensure the redirection, the control and the retransmission of the content requested by a user terminal.

A user terminal comprises, for example, a cache storing the least popular content in memory.

A gateway may comprise an HTTP and TCP proxy.

BRIEF DESCRIPTION OF THE DRAWINGS

Other features and advantages of the present invention will become more clearly apparent upon reading the following description, given by way of wholly non-limiting illustration, alongside the appended figures, in which.

DETAILED DESCRIPTION

Figure 1:
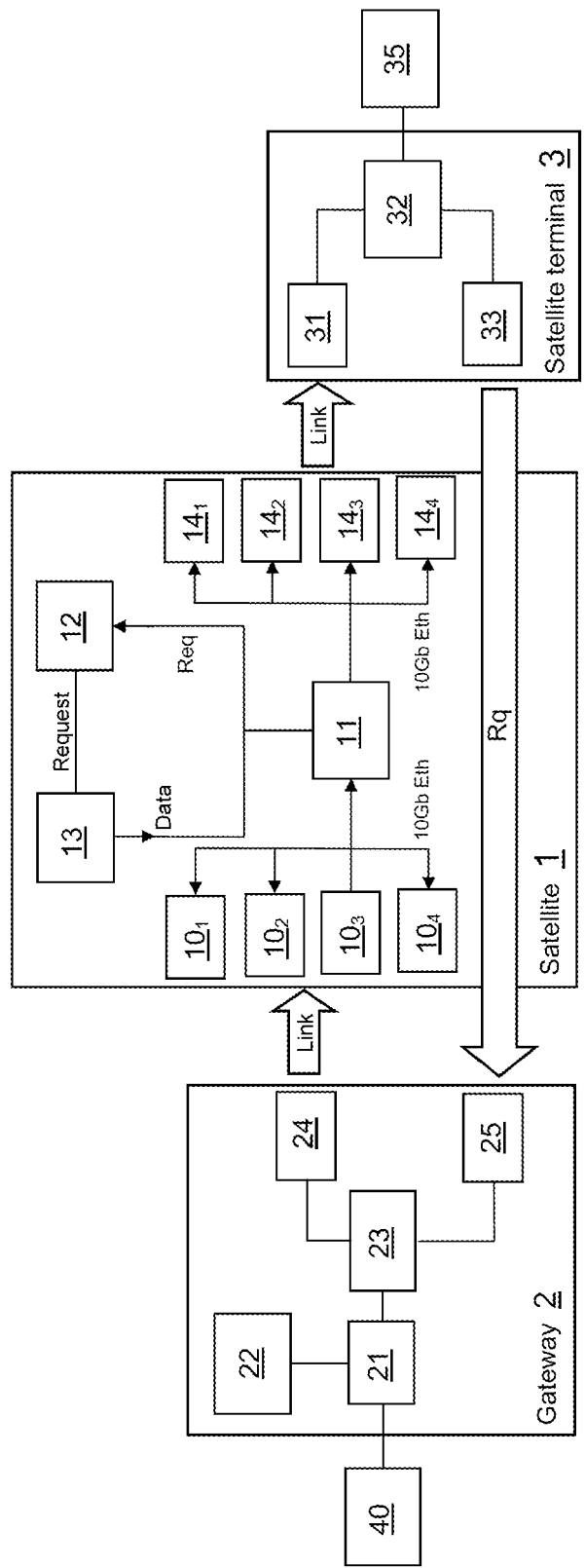
FIG. 1 shows an example of a system architecture diagram according to the invention.

FIG. 1 outlines an example of a system architecture enabling the method according to the invention to be implemented, in which, for the sake of simplicity, just one gateway and just one satellite terminal have been shown in order to elucidate the invention, it being understood that the system may comprise a plurality of gateways and a plurality of users.

The satellite 1 comprises for example a plurality of modems receiving the data flows transmitted by a gateway 2. The data flows are demodulated and decoded by uplink modems $10_1$, $10_2$, $10_3$, $10_4$, before being routed to a switch 11 that redirects them to a processor 12. The indication is sent to the processor 12 for processing, the data flows to be stored (on board or on the ground on the terminals) are routed to an on-board cache or memory 13 having the particular function of storing the eligible data in memory, i.e. the proxy will decide the data that will be stored on board the satellite, generally depending on the type of content and on its popularity. The data flows to be distributed are sent to a set of downlink modems $14_1$, $14_2$, $14_3$, $14_4$, via the switch 11. The decision to store data on board the satellite is for example taken by a gateway or upstream in order to facilitate processing at the satellite (on-board cache and processor). The request contains, for example, the source IP address that designates either the gateway itself or an upstream server managed by the operator of the Satcom system.

Without departing from the scope of the invention, the decision to store may also be taken additionally by the on-board cache in order to decide whether the received data content should be stored. In this case, an increased processing load will have to be assumed.

A gateway 2 has an input receiving the data or data flows transmitted via the Internet, by a provider 40 for example. The data are transmitted to a switch 21, which will redirect them firstly to a caching proxy 22 and secondly to a baseband hub 23 that gathers the data. The caching proxy has various functions, in particular storing objects, controlling data flows, retransmission, etc. The data are transmitted via a transmission modem 24 to the outward path in order to be distributed at the uplink modems of the satellite. The data originating directly from a user on the return path are received by a second modem 25 in order to be demodulated and decoded, and processed by the gateway. The caching proxy in particular has the following main functions:

Decision to cache,
Uploading of content to the on-board cache,
Redirection of the flows,
Congestion control.

The user satellite terminal 3 comprises at least one modem 31 demodulating and decoding the received data before transmitting them to a baseband terminal 32, before transmission to the end users 35, and a modem 33 that is configured to modulate and to code the data before they are transmitted on a return path. The return path enables the data to be transferred to the gateway 2. In the general case, there are a plurality of users behind the satellite. When a plurality of users send a request for one and the same object, the satellite terminal may discern this and not retransmit a copy of the request.

The data may be distributed in a unicast or multicast broadcast, using steps known to those skilled in the art and referred to briefly above.

For the unicast distribution, the content is sent on board beforehand by a ground gateway, via a protocol that ensures the reliability of the data, which protocol is known to those skilled in the art, in particular the TCP (Transmission Control Protocol) transmission protocol. This sending is preferably scheduled when the system is subjected to little load, for example during the night or during periods when there are few active users. This content is then stored on board (cache of the satellite). Secondly, a user terminal requests access to this resource. To this end, the user sends a request Rq (content desired by a user) to the gateway, which identifies the presence of this content as having been transmitted beforehand to the satellite. The gateway then redirects this request Rq to the satellite. The satellite recovers this request, processes it and recovers the data content requested by a user in its cache 13, which content is then sent in unicast mode to the user terminal.

In the case of a multicast broadcast in which the terminals have a cache, the content is sent by a gateway to the satellite, so that said satellite distributes it immediately or stores it in its cache using a reliable protocol that is known to those skilled in the art, for example TCP. The content is then duplicated on each of the outputs concerned with this content, for example all of the spots of a country, of one and the same site or of one and the same group, and the content is sent to the corresponding user terminals through a group broadcast, for example using the Internet protocol IP comprising a Multicast destination address. Upon a user request, the user terminal will verify whether the content requested is not available locally in its cache (cache of the terminal). The request will be sent to the gateway only on the condition that the content has not already been broadcast and stored locally. This multicast solution allows for example to load the most popular data flows or content beforehand in the cache of the user terminals equipped with a cache.

Figure 2:
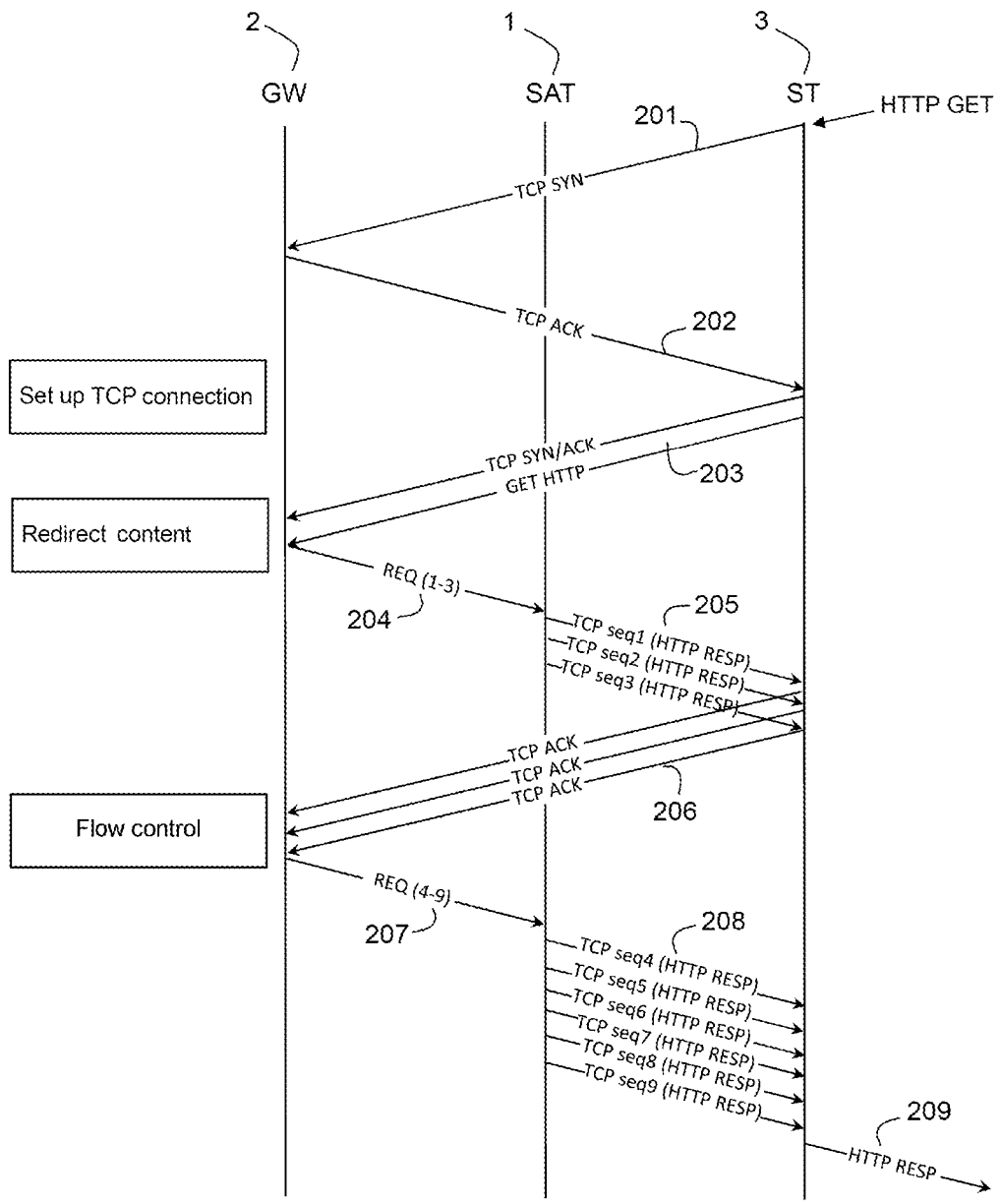
FIG. 2 shows a first example of a sequence of steps.
Figure 3:
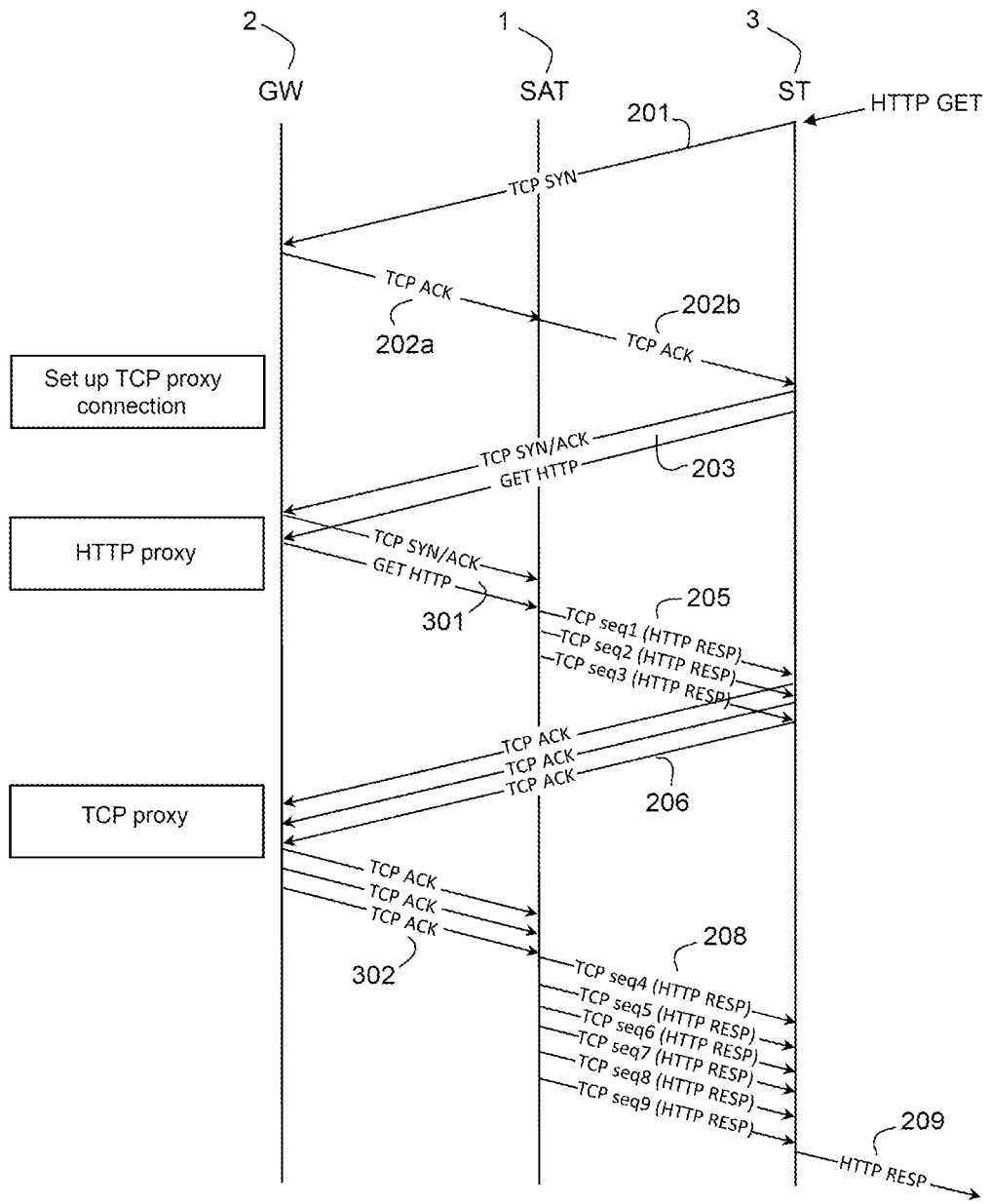
FIG. 3 shows a variant of FIG. 2 with an HTTP proxy on board the satellite.
Figure 4:
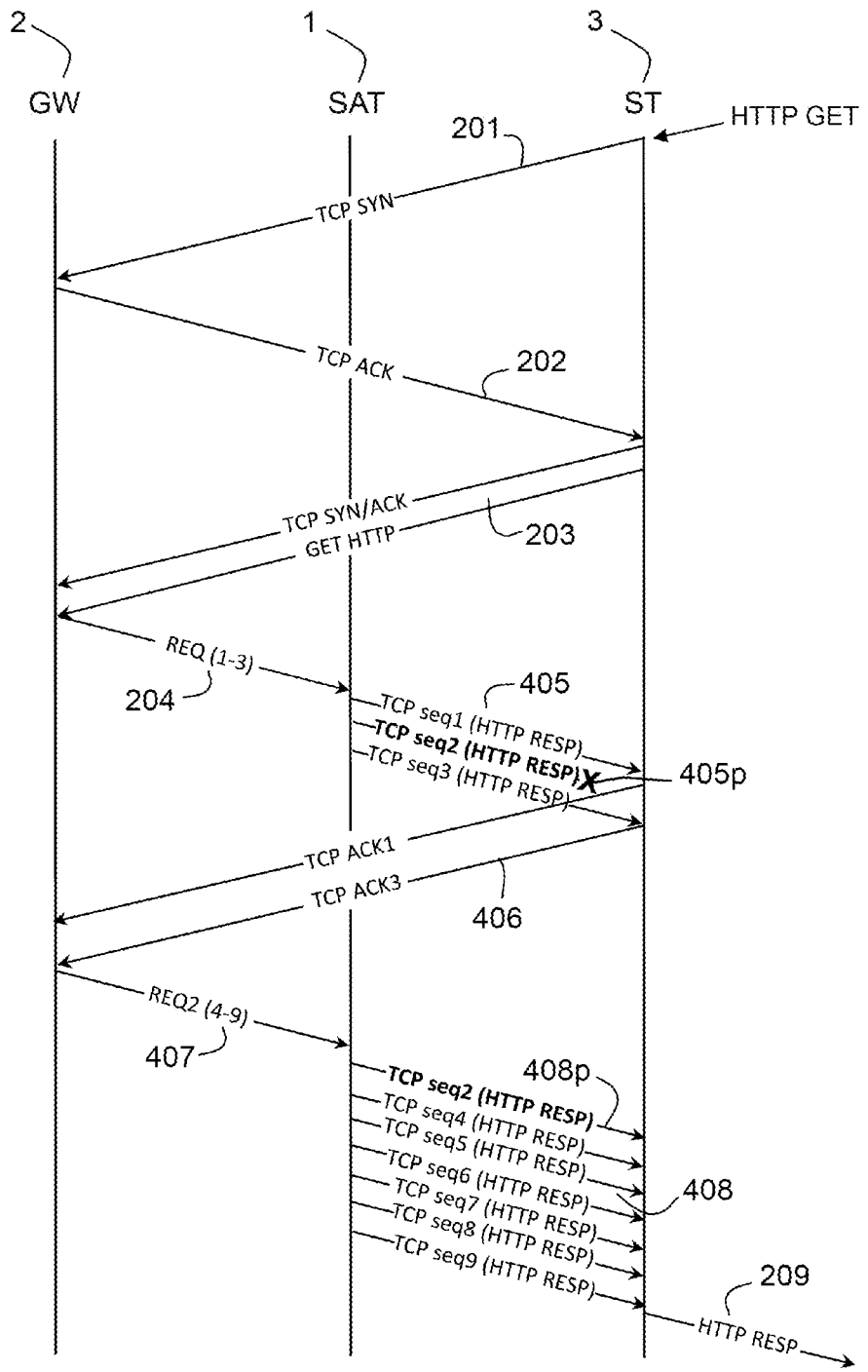
FIG. 4 shows an example of switches of data flows, taking account of the possible loss of packets during the transmission.

FIGS. 2 to 4 make use of identical references, which denote the same steps.

FIG. 2 illustrates the flow of data and requests according to a first implementation variant of the method according to the invention.

Assuming that the user wishes to have access to the content of a webpage or to obtain this content, the user sends a request Rq for example via a keypad or any other appropriate means. The request Rq triggers the steps of configuring and connecting the communication, in particular an opening of a session TCP SYN, 201, with the gateway and an acknowledgement of receipt TCP ACK, 202 of this request Rq by the gateway 2 to the user 3.

The modem only recovers the packets. The connection will be opened by the caching proxy. There is a preliminary redirection phase that is implemented: the user requests content from a provider (Google for example) and the provider or the proxy will indicate whether the content loaded beforehand is available by way of the proxy. The user will make his request to the proxy rather than to the initial server. All of the redirection mechanisms implemented in the steps are known to those skilled in the art (DNS (Domain Name System) or HTTP redirect) and already implemented in caches located in terrestrial networks. The message TCP-SYN is not demodulated/decoded, but transits via the satellite. The message TCP-ACK also transits via the satellite.

With the connection open, the user requests a resource, 203, GET HTTP, at the gateway. The resource request is received by the modem 25 of the gateway, which demodulates and decodes the request and transmits it to the caching proxy 22 of the gateway. Said proxy verifies that the content is indeed available in the on-board cache of the satellite. The gateway 2, after processing the content of the user request Rq, transmits an order to the satellite, 204, REQ({1-3}), indicating to it the data packets contained in the on-board cache 13 that have to be delivered to the user from whom the request originated. The order is transmitted via the outward path to one of the uplink modems of the satellite. It is then directed via the switch 11 to the processor 12 in order to process the content. The satellite 1 transmits the requested data packets that are contained in its cache 13 to the downlink modems and to the requesting user, 205, TCP seq1 (HTTP RESP), TCP seq2 (HTTP RESP), TCP seq3 (HTTP RESP). The user will then transmit an acknowledgement of the effective receipt of the three packets in this example to the gateway, 206, TCP ACK. The acknowledgement is received by a flow control function of the gateway. The content is in fact divided into TCP segments and possibly into a plurality of HTTP objects. In order to transmit all of the content, it will be necessary to transmit all of the HTTP objects (therefore each time this is requested by the user via a message GET), which are themselves divided into a succession of TCP segments (packets). In the given example, the second request REQ({4-9}), 207, will enable sending of the following TCP segments for this same HTTP object, TCP seq4 (HTTP RESP), . . . , TCP seq9 (HTTP RESP), 208. The satellite terminal may ultimately reconstruct the data content HTTP RESP, 209. If a second request is sent by another user for one and the same object, the HTTP RESP may be sent to him immediately with the object.

FIG. 3 illustrates an alternative to the data flow switches of FIG. 2, implementing an HTTP and TCP proxy in the gateway in order to redirect the HTTP requests and TCP acknowledgements, ensuring control of congestion and of retransmission. In this example, the method directly transmits the TCP ACKs, which are generally of the order of 40 bytes per acknowledged segment. The indication REQ is intended to specify all of the segments to be transmitted in a small space, so as to avoid an overhead.

The first steps of opening a session are similar to those described in FIG. 2. The TCP connection is set up between the user and the satellite with redirection via the gateway, TCP SYN, 202a, TCP ACK, 202b. The gateway 2, after processing the content of the user request Rq, transmits an order to the satellite, 301. The satellite 1 transmits the requested data packets that are contained in its cache 13 to the downlink modems 205 and to the requesting user, TCP seq1 (HTTP RESP), TCP seq2 (HTTP RESP), TCP seq3 (HTTP RESP). The satellite terminal will then transmit an acknowledgement of the effective receipt of the three packets, in this example to the gateway, 206, TCP ACK. The gateway will then reiterate the transmission of the following TCP ACKs 302 in order to transmit the remaining segments TCP seq4 (HTTP RESP), . . . , TCP seq9 (HTTP RESP), 208. The satellite may reconstruct the data content HTTP RESP, 209.

The method according to the invention also enables to retransmit the data or the content requested by a user in the event of a loss of packets. FIG. 4 illustrates the exchange of flows of data and requests.

The first steps 201, 202 and 203 for opening a session and configuring the system are identical to those described in FIG. 2. The gateway transmits an order, 204, to the satellite, indicating the content to be transmitted from the cache in accordance with the user request, REQ({1-3}). The user acknowledges the receipt 406 (TCP ACK1, TCP ACK3) of the transmission of a portion of the received content, 405, TCP seq1 (HTTP RESP), TCP seq3 (HTTP RESP), but not that of the content TCP seq2 (HTTP RESP), 405p that has not been received. This loss of packets is detected by the TCP receiver of the gateway, which comprises an integrated mechanism known to those skilled in the art that is configured to detect an interruption in the sequence numbers. The gateway will then retransmit, at the same time as the second request REQ({4-9}), a request REQ(2), to the satellite terminals, for the content lost in the previous transmission from the satellite. The satellite will transmit the content, TCP seq4 (HTTP RESP), . . . , TCP seq9 (HTTP RESP) 408, and TCP seq2 (HTTP RESP) 408p. The satellite may reconstruct the data content HTTP RESP, 209.

Without departing from the scope of the invention, the cache of the satellite may be integrated into a broader hierarchical cache system in which the other caches are present in the gateway and/or in the terminals.

Advantages

The method and the system according to the invention enable in particular an optimized distribution of video content, for example on demand from users, while minimizing the use of the feeder link and the distribution of the content to all of the terminals for additional local storage.

The addition of an on-board cache function in a multi-spot satellite allows in particular:

1) to reduce the use of the band on the gateway-satellite uplink or feeder link, content is set up only once by just one gateway (this better use of the band thus enables possible reduction of the number of GW). With respect to a caching solution with a transparent payload satellite, the gain in band on this link is equivalent to the number of successive accesses to this content, 2) in the case of satellite terminals without a cache:
  a) to reduce the cost of the ground segment,
  b) to reduce the latency for these services (equivalent to a cache located in the gateway), 3) in the case of terminals with a cache:
  a) to increase the amount of cached content and/or to reduce the size of the ground caches by proposing a hierarchical cache system (extremely popular content cached in the ST, very popular content cached on board the satellite), b) to reduce the latency/improve the quality of experience for accessing content cached locally in the terminals, c) to reduce the use of the outward-path band of the user segment for content having to be stored in the terminal. The resulting gain will ultimately be linked to the number of successive accesses to this content in the spot.

The invention claimed is:

1. A method for transmitting data in a satellite system comprising at least one satellite having demodulating/decoding capabilities and a gateway, said at least one satellite being adapted to process and to store user data in an on-board cache as directed at least by the gateway, the satellite system comprising at least one user satellite terminal, the method comprising at least the following steps:
    transmitting a data content request Rq sent by one or more end users to the gateway by way of the user satellite terminal and of the at least one satellite such that the data content request Rq transits the at least one satellite without being demodulated/decoded,
    upon receipt of the data content request Rq, after opening of a communication session, receiving the data content request Rq by the gateway,
    verifying by the gateway that a data content requested by a user is available in an on-board cache of the at least one satellite,
    sending from the gateway an order to the at least one satellite, said order comprising all or some of information contained in the data content request Rq, said order to the at least one satellite indicating a data content or packets that are to be delivered from the on-board cache of the at least one satellite to requesting user terminal(s), and
    transmitting from the at least one satellite the data content to the user from the on-board cache in response to said order and the user terminal(s) acknowledging receipt of at least a portion or of all of this content to the gateway.

2. The method according to claim 1, wherein:
    the data content to be transmitted is divided into a plurality of segments and, in an event of a loss of packets, the user indicates the packets that have been received to the gateway, and
    the gateway determines the loss of packets and resends an order to the at least one satellite requesting the at least one satellite to retransmit lost packet(s) during a following segment transmission sequence associated with the same content.

3. The method according to claim 1, wherein the gateway uses an HTTP and TCP proxy and an acknowledgement indication TCP ACK to indicate to the at least one satellite the data content to be transmitted to a user.

4. The method according to claim 1, wherein the at least one satellite distributes the data content in unicast.

5. The method according to claim 1, wherein the at least one satellite distributes the data content using a multicast distribution protocol for distributing a most popular content to the user satellite terminals.

6. A transmission system for transmitting data in a system comprising at least one satellite having demodulating means, a gateway, and at least one user terminal, wherein:
    the satellite comprises at least a switch receiving decoded and demodulated data flows, said switch transmitting signalling contained in the data flows to a processor, one on-board cache adapted to store user data eligible by a proxy situated in the gateway in memory, and the processor adapted to execute the steps of the method according to claim 1, and
    the gateway comprises at least said proxy adapted to ensure a redirection, control, and retransmission of the content requested by a user terminal.

7. The transmission system according to claim 6, wherein a user terminal comprises a cache storing a least popular content in memory.

8. The transmission system according to claim 6, wherein the gateway comprises an HTTP and TCP proxy.

9. The method according to claim 1 further comprising determining with a caching proxy implemented by the gateway a content to be cached in the on-board cache of the at least one satellite.

10. The method according to claim 9 further comprising uploading with the caching proxy implemented by the gateway the content to be cached in the on-board cache of the at least one satellite.

11. The method according to claim 1 further comprising:
    determining with the gateway an interruption of one or more acknowledgment receipts from the user terminal(s) indicating content lost in a transmission; and
    transmitting from the gateway to the at least one satellite a request to resend the content lost in the transmission.

12. A method for transmitting data in a satellite system comprising at least one satellite having demodulating/decoding capabilities and a gateway, said at least one satellite being configured to process and to store user data in an on-board cache as directed at least by the gateway, the at least one satellite system comprising at least one user satellite terminal, the method comprising at least the following steps:
    transmitting a data content request Rq sent by one or more end users to the gateway by way of the user satellite terminal and of the at least one satellite such that the data content request Rq transits the at least one satellite without being demodulated/decoded,
    receiving the data content request Rq, after opening of a communication session, by the gateway,
    verifying by the gateway that a data content requested by a user is available in an on-board cache of the at least one satellite,
    sending from the gateway an order to the at least one satellite, said order comprising all or some of information contained in the data content request Rq, said order to the at least one satellite indicating a data content or packets that are to be delivered from the on-board cache of the at least one satellite to requesting user terminal(s),
    transmitting from the at least one satellite the data content to the user from the on-board cache of the at least one satellite in response to said order from the gateway, and
    transmitting from the user terminal(s) an acknowledge receipt of at least a portion or of all of this content to the gateway.

13. The method according to claim 12, wherein:
    the data content to be transmitted is divided into a plurality of segments and, in an event of a loss of packets, the user indicates the packets that have been received to the gateway, and
    the gateway determines the loss of packets and resends an order to the at least one satellite requesting the at least one satellite to retransmit lost packet(s) during a following segment transmission sequence associated with the same content.

14. The method according to claim 12, wherein the gateway uses an HTTP and TCP proxy and an acknowledgement indication TCP ACK to indicate to the at least one satellite the data content to be transmitted to a user.

15. The method according to claim 12, wherein the at least one satellite distributes the data content in unicast.

16. The method according to claim 12, wherein the at least one satellite distributes the data content using a multicast distribution protocol for distributing a most popular content to the user satellite terminals.

17. The method according to claim 12 further comprising determining with a caching proxy implemented by the gateway a content to be cached in the on-board cache of the at least one satellite.

18. The method according to claim 17 further comprising uploading with the caching proxy implemented by the gateway the content to be cached in the on-board cache of the at least one satellite.

19. The method according to claim 12 further comprising:
  determining with the gateway an interruption of one or more acknowledgment receipts from the user terminal(s) indicating content lost in a transmission; and
  transmitting from the gateway to the at least one satellite a request to resend the content lost in the transmission.

20. A transmission system for transmitting data in a system comprising at least one satellite having demodulating means, a gateway, and at least one user terminal, wherein:
  the satellite comprises at least a switch receiving decoded and demodulated data flows, said switch transmitting signalling contained in the data flows to a processor, one on-board cache adapted to store user data eligible by a proxy situated in the gateway in memory, and the processor adapted to execute the steps of the method according to claim 12, and
  the gateway comprises at least said proxy adapted to ensure a redirection, control, and retransmission of the content requested by a user terminal.

* * * * *

UNITED STATES PATENT AND TRADEMARK OFFICE
CERTIFICATE OF CORRECTION

PATENT NO. : 10,659,846 B2
APPLICATION NO. : 15/847839
DATED : May 19, 2020
INVENTOR(S) : Cédric Baudoin et al.

Page 1 of 1

It is certified that error appears in the above-identified patent and that said Letters Patent is hereby corrected as shown below:

In the Claims

In Claim 7, Column 8, Line 5, "a least popular" should be --at least popular--.

Signed and Sealed this
Twenty-fourth Day of November, 2020

Andrei Iancu
*Director of the United States Patent and Trademark Office*